(12) United States Patent  
Komiya

(10) Patent No.: US 7,750,614 B2  
(45) Date of Patent: Jul. 6, 2010

(54) SWITCHING REGULATOR WITH A PHASE LOCKED LOOP PHASE LOCKED TO THE OUTPUT VOLTAGE

(75) Inventor: Motoki Komiya, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 403 days.

(21) Appl. No.: 11/882,526

(22) Filed: Aug. 2, 2007

(65) Prior Publication Data

US 2008/0036438 A1 Feb. 14, 2008

(30) Foreign Application Priority Data

Aug. 9, 2006 (JP) ............................. 2006-216322

(51) Int. Cl.
*G05F 1/613* (2006.01)
(52) U.S. Cl. ..................... 323/282; 323/223; 363/56.04
(58) Field of Classification Search ................. 323/223, 323/282, 222, 284, 212, 217, 272, 351, 285, 323/290; 363/56.04

See application file for complete search history.

(56) References Cited

U.S. PATENT DOCUMENTS 4,535,399 A * 8/1985 Szepesi ..................... 363/41

5,359,300 A * 10/1994 Minami ...................... 331/17

FOREIGN PATENT DOCUMENTS

JP 2004-201373 7/2004

* cited by examiner

*Primary Examiner*—Harry Behm
(74) *Attorney, Agent, or Firm*—Oliff & Berridge, PLC

(57) ABSTRACT

A switching regulator for inputting a power source, supplying output power to an external circuit, and adjusting the output voltage to a target voltage, the switching regulator has a switching regulator circuit having first and second transistors, a feedback circuit that receives the output voltage, and outputs a control pulse signal at a frequency in accordance with the received output voltage; a PLL circuit unit having a PLL circuit, and a first control signal generating circuit that outputs the first control signal for controlling the first transistor; and a drive circuit that outputs a second control signal that controls the second transistor; and a control circuit that monitors the period of the PLL output pulse and the control pulse signal, and controls the ON and OFF timing of the second transistor when a difference of monitored periods.

4 Claims, 10 Drawing Sheets

SWITCHING REGULATOR WITH A PHASE LOCKED LOOP PHASE LOCKED TO THE OUTPUT VOLTAGE

CROSS-REFERENCE TO RELATED APPLICATIONS

This application is based upon and claims the benefit of priority from the prior Japanese Patent Application No. 2006-216322, filed on Aug. 9, 2006, the entire contents of which are incorporated herein by reference.

BACKGROUND OF THE INVENTION

1. Field of the Invention

The present invention relates to a switching regulator using a PLL circuit, and more particularly to a switching regulator which controls power loss during anomalous operation.

2. Description of the Related Art

A switching regulator is used in many electronic devices. A switching regulator generally converts an input voltage to a predetermined voltage that is supplied to circuits in the device.

There is currently demand to reduce power loss in such switching regulators in conjunction with the need to reduce power consumption. Japanese Laid-Open Patent Publication No. 2004-201373 discloses a method for reducing power loss in a switching regulator. The art disclosed in Japanese Laid-Open Patent Publication No. 2004-201373 reduces power loss by providing a timing by which to reduce the current and voltage supplied to a transistor, and switching the current and voltage using this timing.

Although the switching regulator of Japanese Laid-Open Patent Publication No. 2004-201373 is not described in detail, a PLL (Phase Locked Loop) circuit is considered for use as a circuit for controlling switching elements such as transistors.

FIG. 1 is a diagram showing a configuration of a conventional switching regulator using a PLL circuit. A conventional switching regulator using a PLL circuit has a coil L that is connected to an input voltage Vin, and a transistor 204 between the coil L and a ground. Furthermore, a transistor 205 is provided between an output terminal 209 and the contact point ds of the transistor 204 and coil L. The input voltage Vin, coil L, and transistors 204 and 205 configure a switching regulator circuit 210. An output terminal 209 is grounded through a smoothing condenser C.

The output voltage supplied to the output terminal 209 is input to a feedback circuit 208. The feedback circuit 208 increases the frequency of the control pulse signal that is output when a high output voltage is received, and decreases the frequency of the control pulse signal that is output when a low output voltage is received. A control pulse signal LMOS output from the feedback circuit 208 is supplied to the PLL circuit 201. Similar to a normal PLL circuit, the PLL circuit 201 includes a phase comparator, a filter for integrating the phase comparator output, and a voltage control oscillator (VCO) for generating a pulse at a frequency in accordance with the integrated voltage value.

The operation of the PLL circuit 201 is described below using FIG. 2A to 2C. The PLL circuit 201 shown in FIG. 2A is configured by a phase comparator 21, a filter 22, and a voltage control oscillator (VCO) 23. FIG. 2B shows an operation timing chart for the control pulse signal LMOS input to the phase comparator 21, signal driver-L, output in PLL of the phase comparator 21, and output pulse PLL of the PLL circuit 201.

When the control pulse signal LMOS and signal driver L are input to the phase comparator 21, the phase difference between the two signals is compared. The detected phase difference φ is fixed. The phase comparator 21 outputs an output in PLL based on the detected phase difference φ. FIG. 2C shows the response characteristics of the phase comparator 21. The phase comparator 21 outputs a potential that is proportional to the detected phase difference φ. The output in PLL from the phase comparator 21 passes through the filter 22, and is input to the voltage control oscillator (VCO) 23. The voltage control oscillator (VCO) 23 outputs an output pulse PLL at a frequency corresponding to the potential of the output in PLL.

Returning now to FIG. 1, the output pulse PLL from the PLL circuit 201 passes through a Schmitt trigger circuit ST1, and is input to a reset terminal R of a flip-flop circuit 202. The voltage at the connecting point ds is supplied to a set terminal S of the flip-flop circuit 202 through a Schmitt trigger circuit ST2. The output Q of the flip-flop circuit 202 is supplied to the gate terminal of a transistor 204 through a buffer circuit 203. Furthermore, the output Q of the flip-flop circuit 202 is fed back to the PLL circuit 201 through the buffer circuit 203. A pulse signal generated in a drive circuit 206 is supplied to the gate terminal of a transistor 205 through a buffer circuit 207.

The operation of the switching regulator of FIG. 1 is described below.

FIG. 3 is an operation timing chart of the switching regulator of FIG. 1. The operation timing chart shows the operation waveforms of the control pulse signal LMOS which is an output from the feedback circuit 208, the output pulse PLL from the PLL circuit 201, the signal driverL input to the gate terminal of the transistor 204, the voltage Vds at the connection point ds, the current IL flowing through the coil L, and the output signal driverH from the drive circuit 206. The PLL circuit 201 performs controls so as to synchronize the rise of the signal driverL with the rise of the control pulse signal LMOS.

The operation of the conventional switching regulator of the figure during the normal operation shown in FIG. 3 is described below.

First, the transistor 204 is turned ON when the signal driverL changes to H level with the timing at which the control pulse signal LMOS becomes H level (time t0). At this time, the coil L is connected between the input power source Vin and a ground. As a result, the current IL flowing through the coil L gradually increases, and energy accumulates in the coil L. The feedback circuit 208 controls the time t1 to turn OFF the transistor 204 since the period during which the transistor 204 is turned ON is controlled in accordance with the output voltage supplied to the output terminal 209. That is, the transistor 204 is turned OFF when the signal driverL is set to L level at time t1.

The signal driverH input to the gate terminal of the transistor 205 changes to H level at time t1, at which the signal driverL becomes L level, the transistor 204 is turned OFF, the voltage Vds rises, and the potential between both ends of the transistor 205 becomes zero (Vds=V209). While the signal driverH is H level, power is output to the output terminal 209, and the voltage Vds at the contact point ds remains fixed. Then, the signal driverH changes to L level at time t2, at which the current IL flowing through the coil L becomes zero. Thereafter, the current IL reverse flows, and the voltage Vds drops and becomes zero at time t3.

Anomalous operation of the conventional switching regulator is described below. Anomalous operation of the conventional switching regulator is generated by a change in the PLL output pulse caused by current noise or the like.

At time T0 shown in FIG. 3, a delay is generated in the PLL output pulse (D1), and the H level is maintained regardless of the timing at which the level must change to L level. Thus, there is also a delay generated in the timing of the fall of the signal driverL (D2). Because a delay is also generated in the fall of the signal driverL, the current increase in the current IL flowing through the coil L is not halted at time T0 at which the signal driverH attains H level. As a result, energy in excess of the energy during normal operation accumulates in the coil L (D3). Then, a condition obtains in which a positive current IL flows at time T1 at which the signal driverH reaches L level, although the current IL becomes zero at time T1 during normal operation. At time T2 at which the current IL actually becomes zero, the signal driverH has already become L level, and the energy accumulated in the coil L is lost without being discharged to the output terminal 209 side.

During anomalous operation of a conventional switching regulator, a process is performed to stop the drive circuit 206 to stop the H level output of the signal driverH at the stage in which one cycle has been completed after the anomalous operation has been generated. This stopping process determines that anomalous operation has occurred and performs a process D5 to stop the H level output of the signal driver H, when a rise in the signal driverL has not been detected within the range of a predetermined time D4 in preparation for the rise of the control pulse signal LMOS. This process temporarily stops output in order to reset the operation due to the unstable operation of the switching regulator.

The energy accumulated in the coil is not released to the output terminal when the transistor operation has been stopped for one cycle in order to correct the timing shift. The large power loss of the switching regulator at this time is extremely inefficient.

SUMMARY OF THE INVENTION

An object of the present invention is to provide a switching regulator controlled using a PLL circuit, which prevents power loss without stopping the operation of transistors when anomalous operation occurs.

To eliminate these problems the switching regulator of the present invention provides a switching regulator for inputting a power source, supplying output power to an external circuit, and adjusting the output voltage supplied to the external circuit to a target voltage, the switching regulator having a switching regulator circuit having a coil that receives current from the power source and accumulates energy, a first transistor that is connected to one end of the coil and is turned ON when energy accumulates in the coil, and a second transistor connected to one end of the coil and is turned ON when output power is supplied to an external circuit; a feedback circuit that receives the output voltage of the switching regulator circuit, and outputs a control pulse signal at a frequency in accordance with the received output voltage; a PLL circuit unit having a PLL circuit that receives the control pulse signal from the feedback circuit, receives a first control signal inputted to the first transistor, and generates a PLL output pulse of a frequency in accordance with the phase difference between the two received signals; and a first control signal generating circuit that is controlled by the rise and fall of the PLL output pulse and the signal of one end of the coil and outputs the first control signal for controlling a conduction of the first transistor; and a drive circuit that outputs a second control signal that controls a conduction of the second transistor; and a control circuit that monitors the period of the PLL output pulse and the period of the control pulse signal, and supplies a timing control signal to the drive circuit to variably control the ON and OFF timing of the second transistor by the second control signal when a difference of not less than a predetermined reference value is generated between the period of the PLL output pulse and the period of the control pulse signal.

In the preferred embodiments of the invention, the control circuit supplies a reset signal to the PLL circuit to reset the PLL circuit when the difference of not less than a predetermined reference value is generated between the PLL output pulse period and the control pulse signal period.

In the preferred embodiments, the control circuit supplies a timing control signal to the drive circuit to delay the timing by which a second transistor is turned OFF when the difference of not less than a predetermined reference value has been generated between the PLL output pulse period and the control pulse period, and the PLL output pulse period is longer than the control pulse period.

Further, in the preferred embodiments, the control circuit supplies a timing control signal to the drive circuit to advance the timing by which a second transistor is turned ON when the difference of not less than a predetermined reference value has been generated between the PLL output pulse period and the control pulse period, and the PLL output pulse period is shorter than the control pulse period.

To solve these problems, a second invention provides a switching regulator that is connected to a power source, generates an output voltage adjusted to a target voltage, and supplies the adjusted output voltage to an external circuit, the switching regulator having a switching regulator circuit having a coil that receives current from the power source and accumulates energy, a first transistor that is connected to the coil and is turned ON when energy accumulates in the coil, and a second transistor that is connected to the coil and is turned ON when power is applied to or drawn from an external circuit;

a feedback circuit that monitor the output voltage of the switching regulator circuit, and outputs a control pulse signal at a frequency corresponding to the output voltage;

a PLL circuit unit having a PLL circuit that receives the control pulse signal and a first control signal for controlling a conduction of the first transistor, and generates a PLL output pulse of a frequency corresponding to the phase difference of the control pulse signal and the first control signal; and a first control signal generating circuit that sets the first control signal to a conduction level or a non-conduction level according to the signal of one end of the coil and the PLL output pulse; and a second control signal generating circuit for generating a second control signal that controls the conduction of the second transistor;

wherein, during the time in which the PLL circuit is in a locked-on condition, the second control signal generating circuit sets the second control signal to a conduction level when the difference in potential is zero between both ends of the second transistor, and sets the same to the non-conduction level after a predetermined time has elapsed; and variably controls the conduction and non-conduction timing of the second transistor by the second control signal when the PLL circuit is in a locked-off condition.

The switching regulator of the present invention measures the period of the control pulse signal generated in accordance with the output voltage, measures the switching timing of a first transistor in advance for one cycle, and promptly detects the occurrence of anomalous operation. Then, the operation timing of a second transistor is controlled in accordance with the detection result. Thus, it is possible to normalize the operation of the switching regulator while preventing power loss.

DESCRIPTION OF THE PREFERRED EMBODIMENTS

The embodiments of the present invention are described hereinafter with reference to the figures. The technical scope of the present invention is not limited to these embodiments, and includes all aspects and equivalences disclosed in the scope of the claims.

Figure 1:
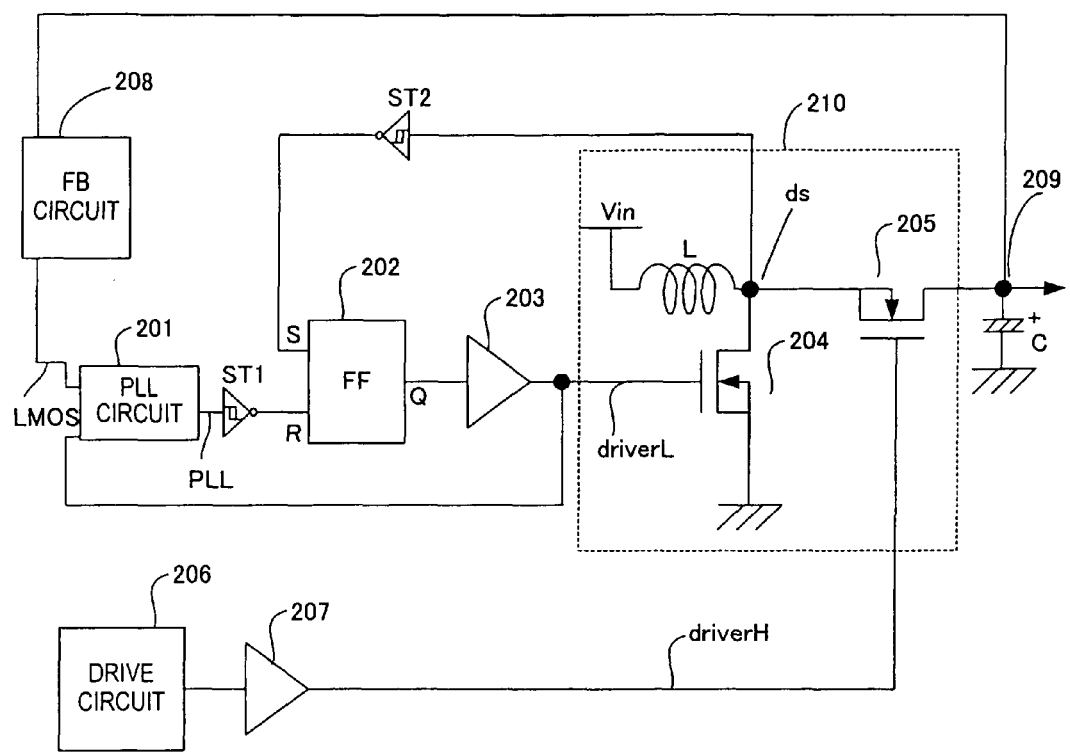
FIG. 1 shows a configuration of a conventional switching regulator using a PLL circuit.
Figure 2A:
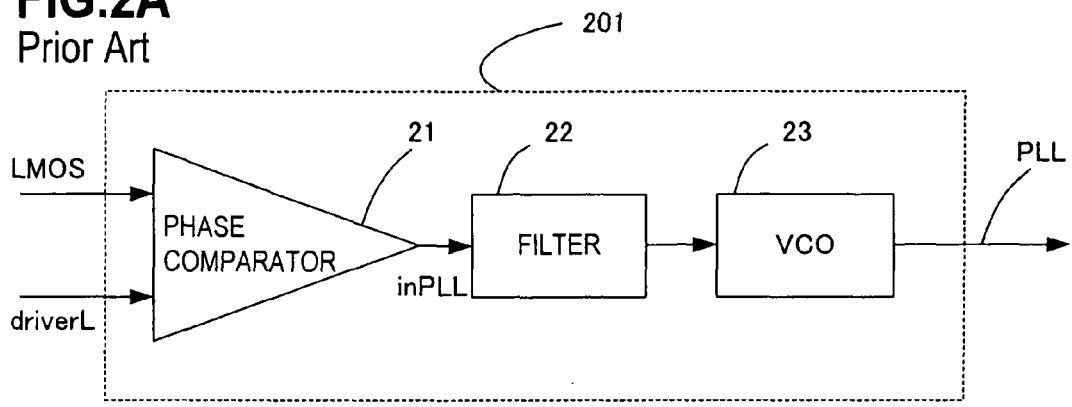
FIGS. 2A to 2C illustrates the configuration and operation of a PLL circuit.
Figure 2B:
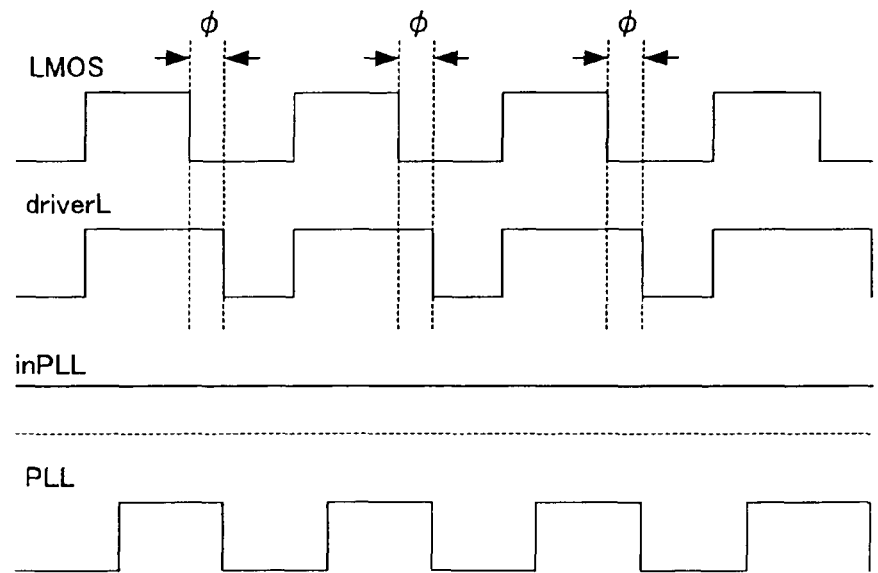
Figure 2C:
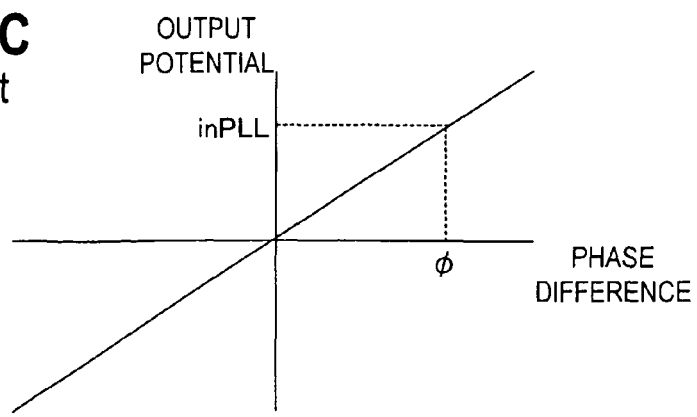
Figure 3:
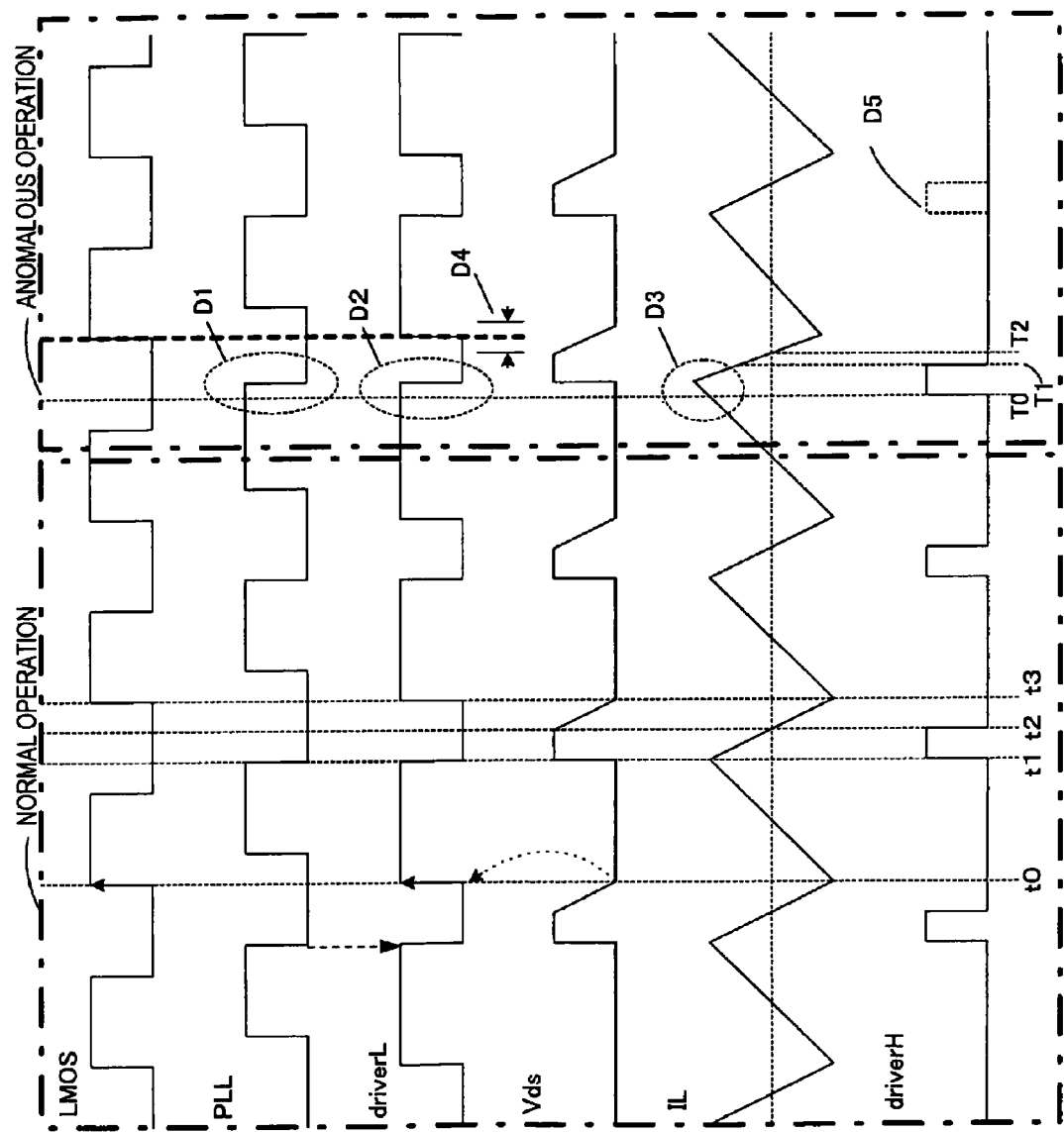
FIG. 3 is a timing chart of the operation of the switching regulator of FIG. 1.
Figure 4:
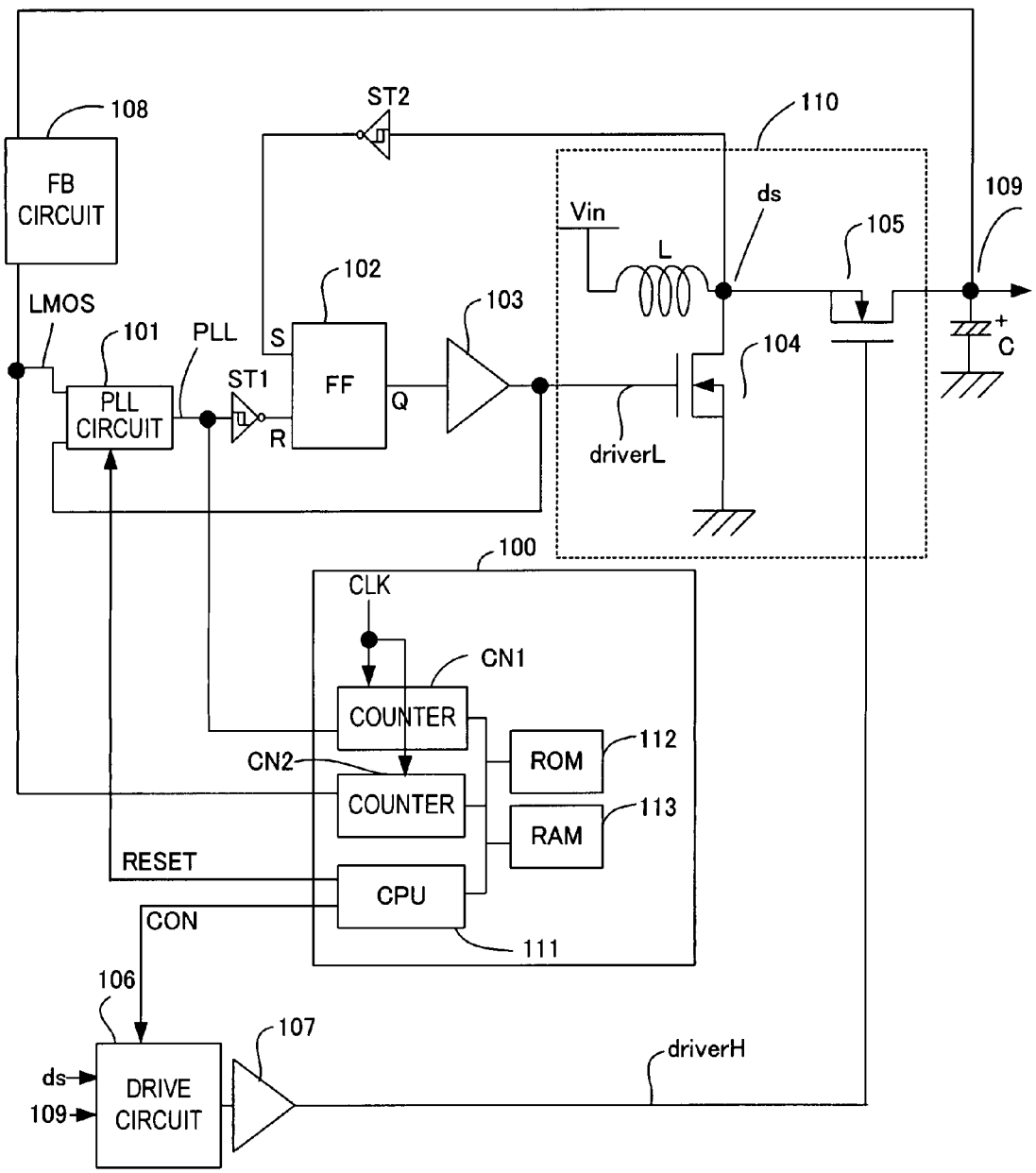
FIG. 4 shows the configuration of the switching regulator of the present invention.

FIG. 4 shows the configuration of the switching regulator of the present invention. The switching regulator of the present invention has a transistor 104 between a ground and a coil L, which is connected to an input power source Vin. A transistor 105 is provided between an output terminal 109 and the connecting point ds between the coil L and the transistor 104. The input power source Vin, the coil L, and the transistors 104 and 105 configure a switching regulator circuit 110. Furthermore, a output terminal 109 is grounded through a smoothing condenser C.

The output voltage generated in the output terminal 109 is input to a feedback circuit 108. The feedback circuit 108 increases the frequency of the control pulse signal LMOS that is output when a high output voltage is received, and decreases the frequency of the control pulse signal LMOS that is output when a low output voltage is received. That is, the feedback circuit 108 outputs a control pulse signal LMOS that has been subjected to pulse width modulation in accordance with the output voltage. The control pulse signal LMOS output from the feedback circuit 108 is input to the PLL circuit 101. Similar to a normal PLL circuit that is not shown in the figure, the PLL circuit 101 has a phase comparator, a filter for integrating the output of the phase comparator, and a voltage control oscillator (VCO) for generating a pulse having a frequency in accordance with the integrated voltage value.

The output pulse PLL of the PLL circuit 101 is reversed through a Schmitt trigger circuit ST, and input to a reset terminal R of a flip-flop circuit 102. Furthermore, the voltage of the connecting point ds is supplied through the Schmitt trigger circuit ST to a set terminal S of the flip-flop circuit 102. A signal driverL, which is the output of the flip-flop circuit 102, is supplied through a buffer circuit 103 to the gate terminal of the transistor 104. Thus, the flip-flop circuit 102 is a circuit that generates a first control signal driverL; the first control signal driverL falls synchronously with the falling edge of the output pulse PLL, and rises when the voltage of the connecting point ds is zero (zero between both terminals of the transistor 104). A second control signal driverH, which is generated by a drive circuit 106, is supplied through a buffer circuit 107 to the gate terminal of the transistor 105. The drive circuit 106 increases the second control signal driverH when the voltage of an output terminal 109 and the voltage of the connecting point ds are equal (zero between both terminals of the transistor 105), and decreases the second control signal driverH after a predetermined time (after a predicted time when the coil current becomes zero).

The switching regulator of the present invention further has a control circuit 100, which detects anomalous operation. The control circuit 100 holds programs in an internal ROM (read Only Memory) 112, expands those programs in a RAM (Random Access Memory) 113 when a power source is turned ON, and executes these programs via a CPU (Central Processing Unit) 111. Furthermore, the control circuit 100 has a counter circuit CN1 that receives the PLL output pulse. The counter circuit CN1 is a circuit that starts and ends the count at the fall of the PLL output pulse. The PLL output pulse operation cycle can be detected by the counter circuit CN1. The control circuit 100 has a counter circuit CN2 that receives the control pulse signal LMOS. The counter circuit CN2 is a circuit that starts and ends the count at the fall of the control pulse signal LMOS. The control circuit 100 can detect the operation cycle of the switching regulator of the present invention by the counter circuit CN2.

The operation of the switching regulator of FIG. 4 is described below.

Figure 5:
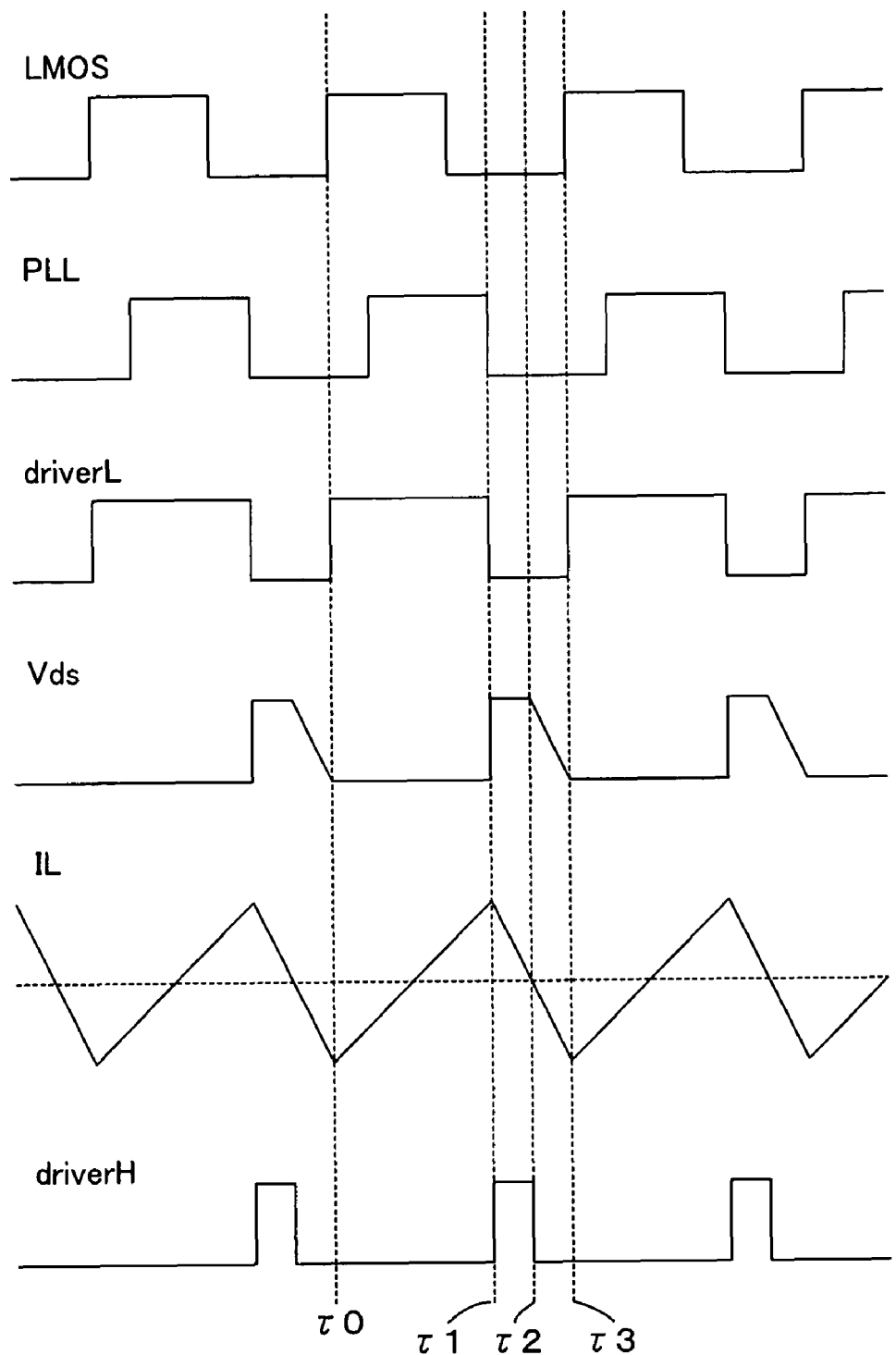
FIG. 5 is a timing chart of the operation of the control circuit of the switching regulator in FIG. 4 of the present invention during normal operation.

FIG. 5 is an operation timing chart for normal operation of the switching regulator of FIG. 4. The operation timing chart shows the operation waveforms of the control pulse signal LMOS which is output from the feedback circuit 108, the output pulse PLL of the PLL circuit 101, the first control signal driverL that is input to the gate terminal of the transistor 104, the voltage Vds at the connecting point ds, the current IL that flows through the coil L, and the second control signal driverH that is output from the drive circuit 106. The PLL circuit 101 is controlled so as to synchronize the rise of the control pulse signal LMOS and the rise of the first control signal driverL.

First, the signal driverL becomes H level simultaneously with the control signal pulse LMOS becoming H level, and the transistor 104 is turned ON (time τ0). The coil L is connected between a ground and the input power source Vin. As a result, the current IL flowing through the coil L gradually increases, and energy accumulates in the coil L. The feedback circuit 108 controls the time τ1 at which the transistor 104 is turned OFF in order to control the conduction period of the transistor 104 (the period during which the first control signal driverL is H level) in accordance with the output voltage supplied to the output terminal 109. That is, the PLL circuit 101 controls the timing of the fall of the output pulse PLL so as to synchronize the timing of the rise of the control pulse signal LMOS and the first control signal driverL, such that the transistor 104 is turned OFF when the first control signal driverL becomes L level at time τ1. However, the first control signal driverL becomes H level when the connecting point voltage Vds becomes zero and the voltage between both terminals of the transistor 104 becomes zero.

At time τ1 at which the first control signal driverL becomes L level, the drive circuit 106 switches the second control signal driverH, which is input to the gate terminal of the transistor 105, to H level with a timing at which the voltage of the connecting point ds and the voltage of the output terminal 109 become equal. While the second control signal driverH is H level, power is output to the output terminal 109, and the voltage Vds of the connecting point ds remains constant. Then, the second control signal driverH switches to L level at time τ2 at which the current IL flowing through the coil L becomes zero. Thereafter, the current IL reverses and the voltage Vds drops until the voltage Vds becomes zero at time τ3.

The operation of the control circuit 100 during normal operation shown in FIG. 5 is described below.

Figure 6:
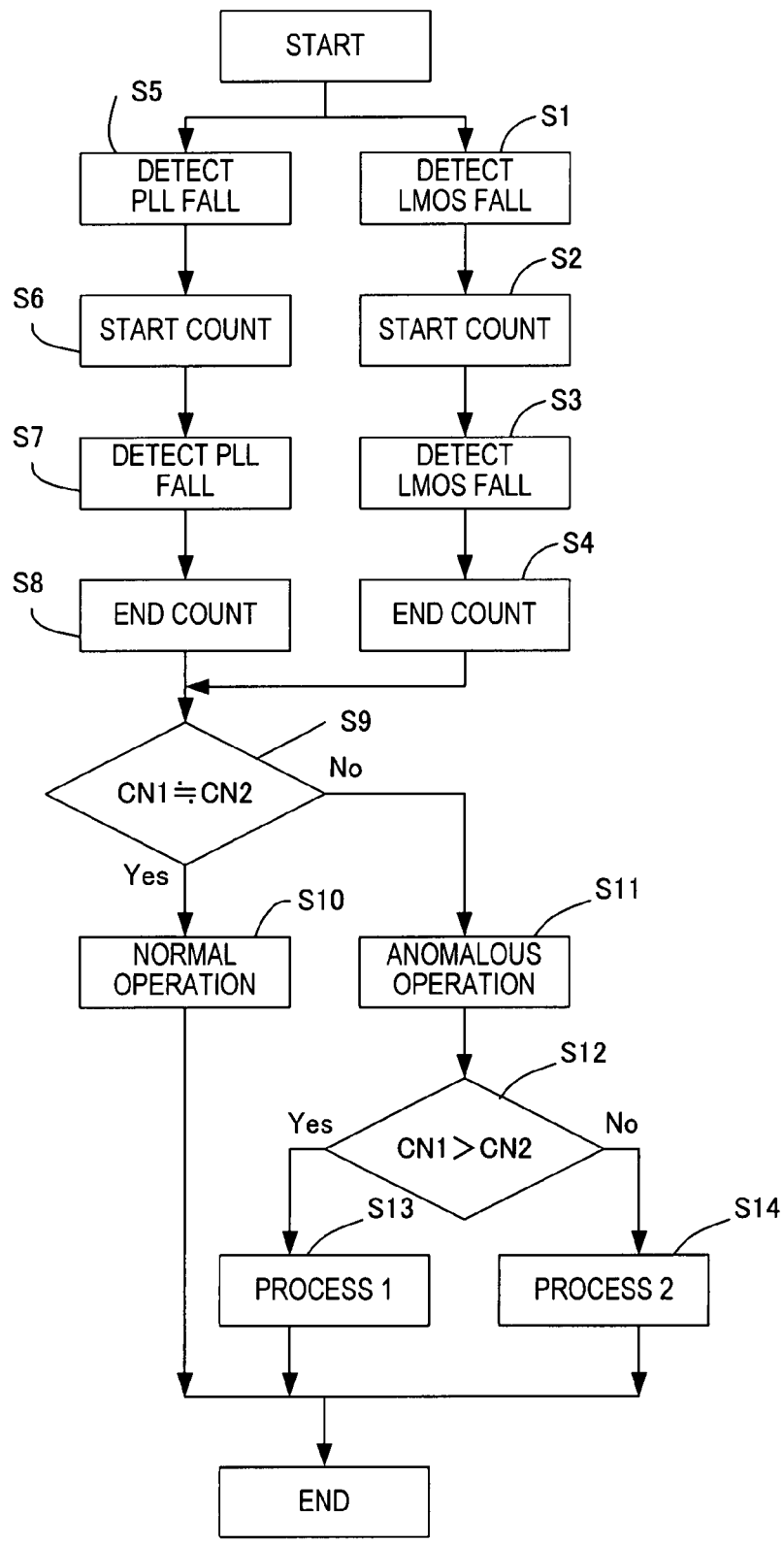
FIG. 6 shows the operation flow of the control circuit of the switching regulator of the present invention.

FIG. 6 shows the operation flow of the control circuit 100 in the switching regulator of the present invention. The operation flow is executed every operation cycle of the switching regulator. When starting, the fall of the control pulse signal LMOS is detected first (step S1), and the counter circuit CN2 starts the count of a clock CLK step S2). Then, the fall of the output pulse PLL of the PLL, which receives the delayed fall of the control pulse signal LMOS, is detected (step S5), and the counter circuit CN1 starts the count of a clock CLK (step S6).

Thereafter, the fall of the control pulse signal LMOS is again detected (step S3), and the counter circuit CN2 ends the count (step S4). Further, the fall of the PLL output pulse is again detected (step S7), and the counter circuit CN1 ends the count (step S8). Then, the CPU 111 confirms whether or not the difference between the counts of the counter circuits CN1 and CN2 is within a predetermined range (step S9), and when the count difference is within a predetermined range, the PLL circuit is determined to be operating normally in a locked-on state (step S10), and the operation flow ends. Normal operation (locked-on state) is determined when operating according to the timing chart shown in FIG. 5. Moreover, the predetermined range used in the determination of step S9 may be different when the count value of the counter circuit CN1 is either high or low.

The CPU 111 determines anomalous operation (unlocked) (step S11) when an error in the counts of the counter circuits CN1 and CN2 is outside a predetermined range, and the counts of the counter circuits CN1 and CN2 are compared (step S12). A process 1 is executed when the counter circuit CN1 has an over-count (step S13), and the operation flow ends. Further, a process 2 is executed when the counter circuit CN2 has an over-count (step S14), and the operation flow ends. Processes 1 and 2 are described in detail below.

The processes performed during anomalous operation of the switching regulator of the present invention are described below. Anomalous operation of the switching regulator may be due to changes in the PLL output pulse caused by current noise or the like.

Figure 7:
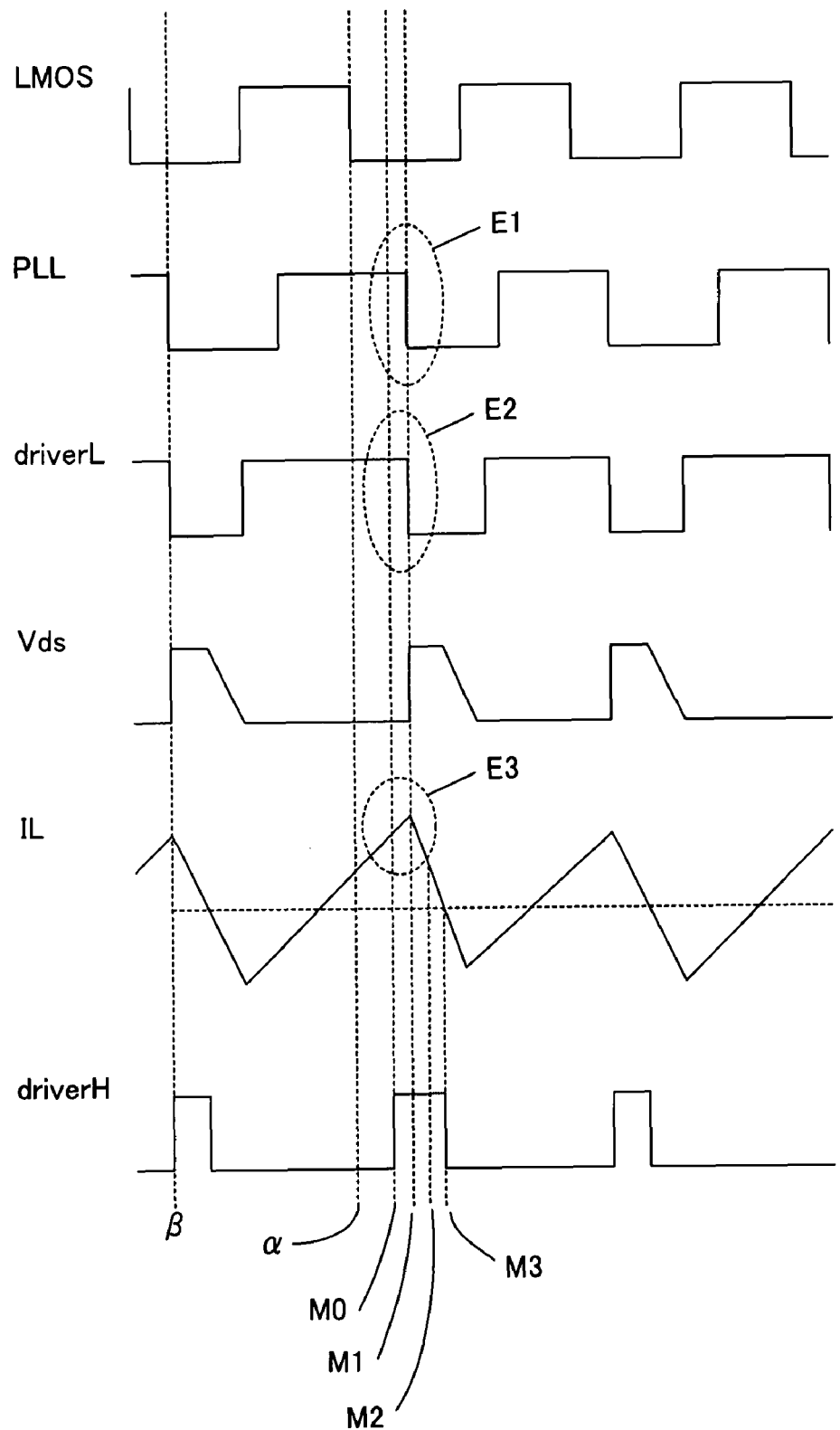
FIG. 7 is a timing chart showing delayed timing of the fall of the PLL output pulse.

FIG. 7 is a timing chart of delayed timing for the fall of the PLL output pulse. During normal operation, the PLL output pulse falls at time M0. However, a delay is generated in the PLL output pulse when anomalous operation occurs due to current noise or the like, and the H level is maintained regardless of the timing by which the pulse must be switched to L level (E1). A delay is also generated in the timing for the fall of the signal driverL by the fall of the output pulse PLL of the PLL at time M1 (E2). The current IL flowing through the coil L does not stop increasing at time M0 at which the signal driverH is switched to H level due to the delay in the timing for the fall of the signal driverL. As a result, the current IL flowing through the coil L continues to increase until time M1, and energy in excess of that during normal operation accumulates in the coil L.

At this time, the control circuit 100 monitors the PLL output pulse and the control pulse signal LMOS. The control circuit 100 in the switching regulator of the present invention detects the fall of the control pulse signal LMOS (step S1 in FIG. 6), and the counter circuit CN2 starts the count of the clock CLK. At time α in FIG. 7, an operation period of the switching regulator of the present invention occurs that follows the fall of the control pulse signal LMOS.

On the one hand, the counter circuit CN1 starts the count of the clock CLK after the PLL output pulse falls at time β (step S6 in FIG. 6). According to the operation period obtained by the counter circuit CN2, the control circuit 100 can predict the start of the next fall of the PLL output pulse at time M0, and normal operation of the switching regulator is confirmed if the fall of the PLL output pulse is detected in a predetermined range centered on the time M0 (step S10 in FIG. 6).

In FIG. 7, however, the control circuit 100 detects anomalous operation (that is, unlocked state) since the PLL output pulse falls at time M1, which is outside a predetermined range not shown in the figure (step S11 in FIG. 6), and process 1 of step S13 in FIG. 6 is executed because the count of the counter circuit CN1 is greater than the count of the counter circuit CN2.

At this time, process 1, for example, lengthens the H level output of the signal driverH. In FIG. 7, when the delay of the PLL output pulse PLL has been detected, the control circuit 100 supplies a timing control signal CON to the drive circuit 106, and the signal driverH does not restore to L level at time M2 at which the signal driverH does restore to L level during normal operation. This continuance is so that a positive current flows in the coil L at time M2 and prevents the output of the accumulated energy to the output terminal 109. Then, the signal driverH is switched to L level at time M3 at which the current IL flowing through the coil L becomes zero. Thus, all the energy accumulated in the coil L is output to the output terminal 109 and power loss is prevented. The CPU 111 calculates the time M3 at which the current IL becomes zero based on the delay of the PLL output pulse PLL.

Furthermore, the control circuit 100 transmits a reset signal RESET to the PLL circuit 101 at this time to restore the timing of the delayed PLL output pulse. When the reset signal has been received, the PLL circuit 101 initializes the signal input to the internal voltage control oscillator (VCO), and restores the delay of the PLL output pulse.

Thus, the switching regulator of the present invention measures the length of one cycle from the period of the control pulse signal generated in accordance with the output voltage feedback, measures the switching timing from before one cycle, and promptly detects when anomalous operation is generated. Then, the switching timing is corrected without stopping the operation of the transistors, thus preventing power loss.

The process when the timing for the fall of the PLL output pulse has advanced more than normal operation is described below.

Figure 8:
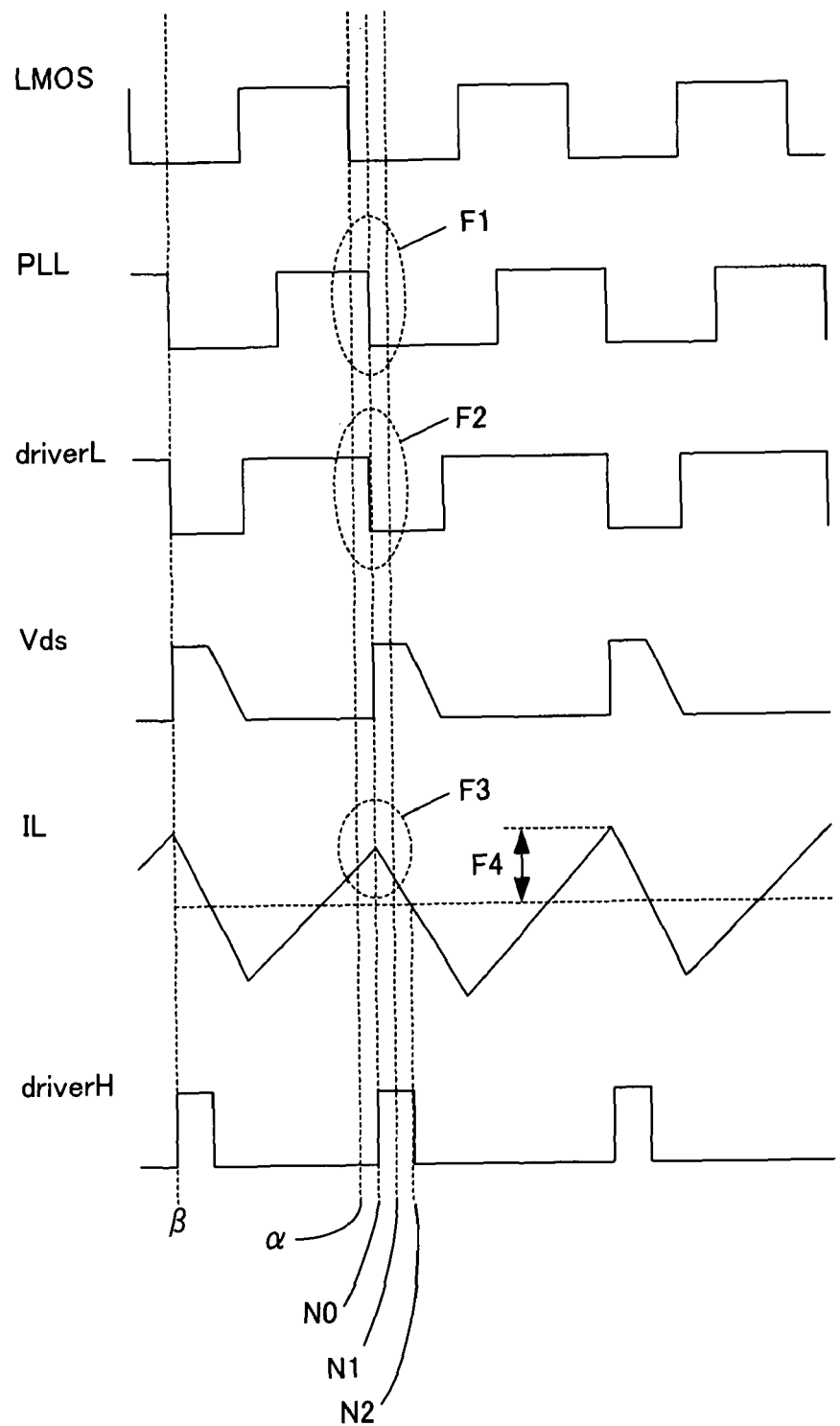
FIG. 8 is a timing chart showing the timing of the fall of the PLL output pulse advanced more than during normal operation.

FIG. 8 is a timing chart when the timing for the fall of the PLL output pulse has advanced more than normal operation. The PLL output pulse PLL falls at time N1 during normal operation. However, anomalous operation occurs at this time due to current noise or the like, the PLL output pulse advances and the timing to switch to L level is sped up (F1). At time N0, the timing for the fall of the signal driver L is accelerated by the fall of the PLL output pulse at time N0 (F2). The current IL flowing through the coil L does not increase until reaching the maximum value F4 of normal operation due to the accelerated timing of the fall of the signal driver L. The current IL flowing through the coil L stops increasing at time N0, and the energy accumulated in the coil L is less than the energy during normal operation.

At this time, the control circuit 100 monitors the PLL output pulse PLL, and the control pulse signal LMOS. The control circuit 100 of the switching regulator of the present invention detects the fall of the control pulse signal LMOS (step S1 in FIG. 6), and the counter circuit CN2 starts the count of the clock CLK (step S2 in FIG. 6). The operating period of the switching regulator of the present invention follows the fall of the control pulse signal LMOS at time α in FIG. 8.

On one hand, the counter circuit CN1 starts the count of the clock CLK after the PLL output pulse falls at time β (step S6 in FIG. 6). After the operation period obtained by the counter circuit CN2, the control circuit 100 can predict the start of the next fall of the PLL output pulse at time N1, and normal operation of the switching regulator is confirmed if the fall of the PLL output pulse is detected in a predetermined range not shown in the figure centered on the time N1 (step S10 in FIG. 6).

In FIG. 8, however, the control circuit 100 detects anomalous operation since the PLL output pulse falls at time N0, which is outside a predetermined range not shown in the figure (step S11 in FIG. 6), and process 2 of step S14 in FIG. 6 is executed because the count of the counter circuit CN1 is less than the count of the counter circuit CN2.

At this time, process 2, for example, accelerates the switching of the signal driverH from L level to H level. In FIG. 8, when the fall of the PLL output pulse has been detected at time N0, the control circuit 100 promptly sends a timing control signal CON to the drive circuit 106, and the signal driverH is switched to H level. Then, the CPU 111 calculates the timing at which the current IL flowing through the coil L becomes zero based on the operation period of the received control pulse signal LMOS counted by the counter circuit CN2 and the condition of the advanced fall of the PLL output pulse, and the control circuit 100 switches the signal driverH from H level to L level (time N2). Thus, all the energy accumulated in the coil L is output to the output terminal 109 at N2 after time N0 and power loss is prevented.

Furthermore, the control circuit 100 sends a reset signal RESET to the PLL circuit 101 at this time since the advanced PLL output pulse timing has been restored. When the reset signal has been received, the PLL circuit 101 initializes the signal input to the internal voltage control oscillator (VCO), and restores the advanced PLL output pulse.

Thus, the switching regulator of the present invention measures the length (one cycle) of the period of the control pulse signal generated in accordance with the output voltage feedback, measures the switching timing in advance for one cycle, and promptly detects when anomalous operation is generated. Then, the switching timing is corrected without stopping the operation of the transistors, thus preventing power loss.

Figure 9:
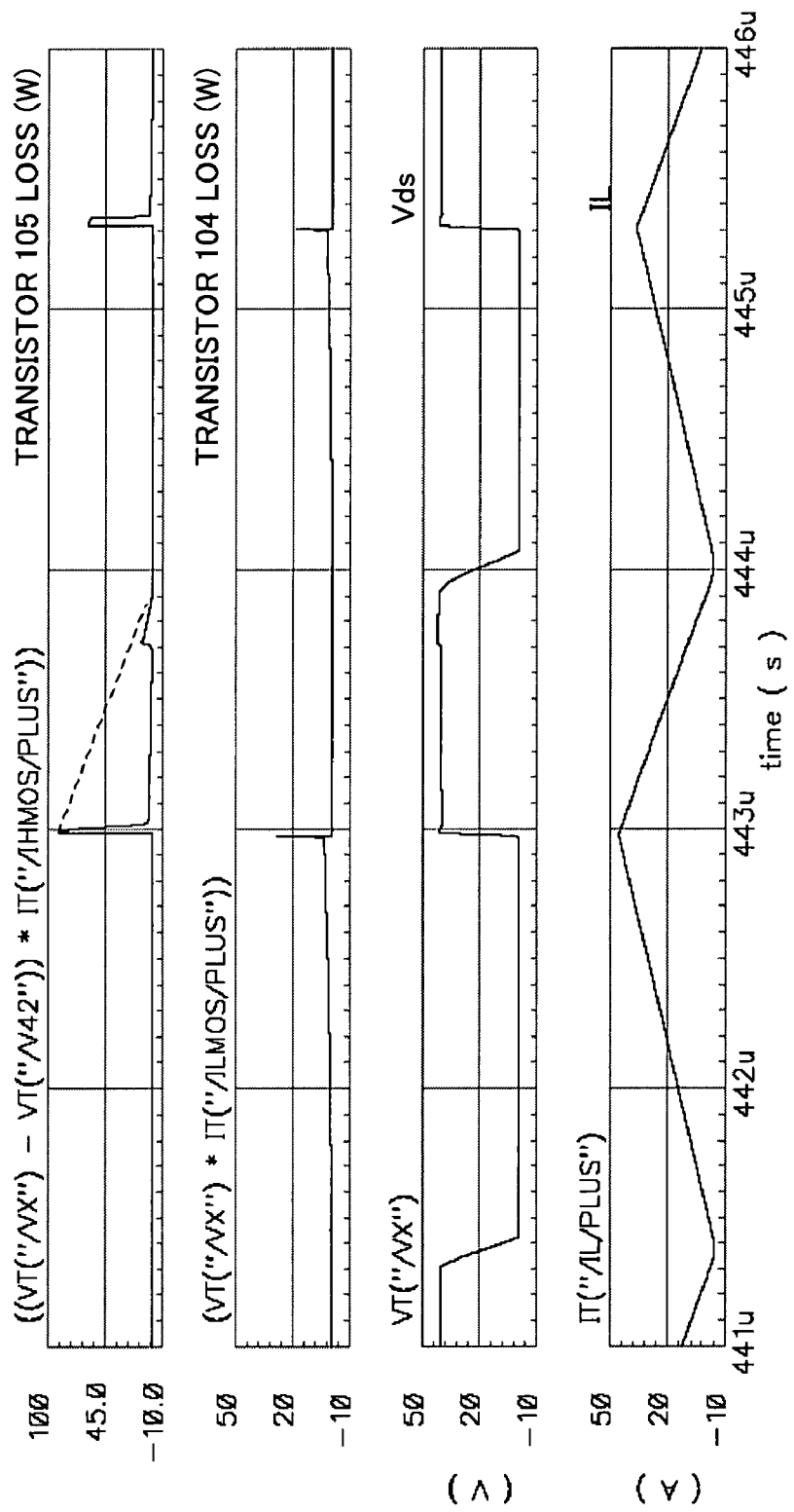
FIG. 9 shows the results when using the switching regulator of the present invention.

FIG. 9 shows the results when the switching regulator of the present invention is used. FIG. 9 shows the power loss from the transistor 105, the power loss from the transistor 104, the voltage at the connecting point ds, and the current IL flowing through the coil L. Power loss from the transistor 105 is reduced when the switching regulator of the present invention is used. The dashed line in the figure showing the power loss from the transistor 105 indicates the power loss when the switching regulator of the present invention is not used; an average of 16.88 watts per cycle are lost. However, the average power loss can be reduced to 1.52 watts per cycle by applying the present invention. Therefore, the switching timing is corrected without stopping the operation of the transistors, and power loss is prevented.

Figure 10:
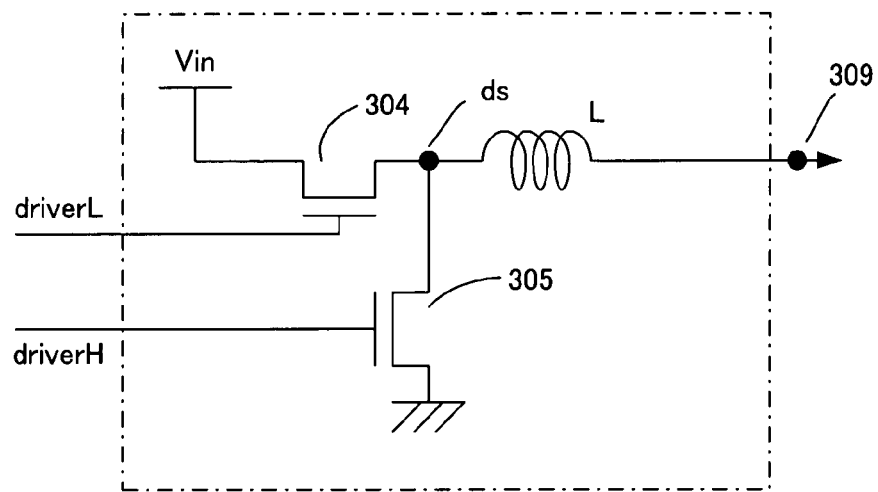
FIG. 10 is a structural view of a step-up type switching regulator circuit.
Figure 11:
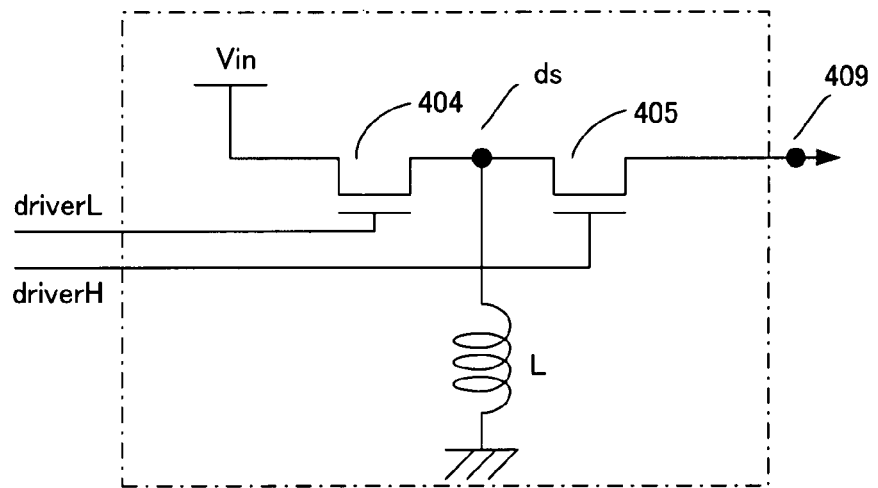
FIG. 11 is a structural view of a reversal type switching regulator circuit.

Although the switching regulator 110 configured by an input power source Vin, coil L, and transistors 104 and 105 shown in FIG. 4 uses a step-up voltage method, the switching regulator may also be realized using a step-down voltage method shown in FIG. 10, and using a reversal method shown in FIG. 11.

The operation of a switching regulator circuit 110 using the step-down voltage method shown in FIG. 10 is described below. This circuit drops the voltage of the power source Vin and outputs the stepped-down voltage to the output terminal 309. When an H level signal driver L is supplied and a transistor 304 is turned ON, the input power source Vin and the coil L are connected. At this time, power is supplied to an output terminal 309 and energy accumulates in the coil L. Thereafter, the energy accumulated in the coil L is output to the output terminal 309 when the signal drive L is stopped thus turning OFF the transistor 304, and the transistor 305 receives the signal driver H and is turned ON. Therefore, the switching regulator using the step-down method supplies power to the output terminal similar to the step-up method.

The operation of a switching regulator circuit 110 using the reversal method shown in FIG. 11 is described below. This circuit outputs a negative voltage to the output terminal 409. When an H level signal driver L is supplied and a transistor 404 is turned ON, the input power source Vin and the coil L are connected. Current flows from the input power source Vin, and energy accumulates in the coil L. At this time, a load accumulates in the parasitic capacity between a transistor 405 and the output terminal 409. Thereafter, the transistor 404 is turned OFF, and the transistor 405 is turned ON by receiving the signal driver H. At this time, the load between the transistor 405 and the output terminal 409 passes through the coil L and the current flows to a ground. In conjunction therewith, a current flows from the output terminal 409 to the connecting point ds, and a reversed polarity voltage is supplied to the output terminal 409. Thus, the switching regulator using the reversal method supplies power to the output terminal similar to the step-up method.

The switching regulator circuit 110 configured by an input power-source-Vin, coil L, and transistors 104 and 105 shown in FIG. 4 may be present in multiplicity, such that the present invention may be applied identically even in the case of multiphase switching regulators connected in parallel. In this case, the feedback circuit 108 supplies respectively phase-shifted control pulse signals LMOS to a plurality of switching regulators.

What is claimed is:

1. A switching regulator for inputting a power source, supplying output power to an external circuit, and adjusting an output voltage supplied to the external circuit to a target voltage, comprising:

a switching regulator circuit having a coil that receives current from the power source and accumulates energy, a first transistor that is connected to one end of the coil and is turned ON when energy accumulates in the coil, and a second transistor connected to one end of the coil and is turned ON when output power is supplied to an external circuit;

a feedback circuit that receives the output voltage of the switching regulator circuit, and outputs a control pulse signal at a frequency in accordance with the received output voltage;

a PLL circuit unit having a PLL circuit that receives the control pulse signal from the feedback circuit, receives a first control signal inputted to the first transistor, and generates a PLL output pulse having a frequency in accordance with a phase difference between the two received signals, and a first control signal generating circuit that is controlled by the rise and fall of the PLL output pulse and the signal of one end of the coil and outputs the first control signal for controlling a conduction of the first transistor;

a drive circuit that outputs a second control signal that controls a conduction of the second transistor; and a control circuit that monitors a period of the PLL output pulse and a period of the control pulse signal, and supplies a timing control signal to the drive circuit to variably control OFF timing of the second transistor by the second control signal when a difference of not less than a predetermined reference value is generated between the period of the PLL output pulse and the period of the control pulse signal, wherein the control circuit supplies a reset signal to the PLL circuit to reset the PLL circuit when a difference of not less than the predetermined reference value is generated between the period of the PLL output pulse and the period of the control pulse signal.

2. A switching regulator for inputting a power source, supplying output power to an external circuit, and adjusting an output voltage supplied to the external circuit to a target voltage, comprising:

a switching regulator circuit having a coil that receives current from the power source and accumulates energy, a first transistor that is connected to one end of the coil and is turned ON when energy accumulates in the coil, and a second transistor connected to one end of the coil and is turned ON when output power is supplied to an external circuit;

a feedback circuit that receives the output voltage of the switching regulator circuit, and outputs a control pulse signal at a frequency in accordance with the received output voltage;

a PLL circuit unit having a PLL circuit that receives the control pulse signal from the feedback circuit, receives a first control signal inputted to the first transistor, and generates a PLL output pulse having a frequency in accordance with a phase difference between the two received signals, and a first control signal generating circuit that is controlled by the rise and fall of the PLL output pulse and the signal of one end of the coil and outputs the first control signal for controlling a conduction of the first transistor;

a drive circuit that outputs a second control signal that controls a conduction of the second transistor; and a control circuit that monitors a period of the PLL output pulse and a period of the control pulse signal, and supplies a timing control signal to the drive circuit to variably control OFF timing of the second transistor by the second control signal when a difference of not less than a predetermined reference value is generated between the period of the PLL output pulse and the period of the control pulse signal, wherein the control circuit comprises a first counter for counting a reference clock during one period of the PLL output pulse;

a second counter for counting the reference clock during one period of the control pulse signal; and a control unit for comparing count values of the first and second counters and outputting a timing control signal.

3. A switching regulator for inputting a power source, supplying output power to an external circuit, and adjusting an output voltage supplied to the external circuit to a target voltage, comprising:

a switching regulator circuit having a coil that receives current from the power source and accumulates energy, a first transistor that is connected to one end of the coil and is turned ON when energy accumulates in the coil, and a second transistor connected to one end of the coil and is turned ON when output power is supplied to an external circuit;

a feedback circuit that receives the output voltage of the switching regulator circuit, and outputs a control pulse signal at a frequency in accordance with the received output voltage;

a PLL circuit unit having a PLL circuit that receives the control pulse signal from the feedback circuit, receives a first control signal inputted to the first transistor, and generates a PLL output pulse having a frequency in accordance with a phase difference between the two received signals, and a first control signal generating circuit that is controlled by the rise and fall of the PLL output pulse and the signal of one end of the coil and outputs the first control signal for controlling a conduction of the first transistor;

a drive circuit that outputs a second control signal that controls a conduction of the second transistor; and a control circuit that monitors a period of the PLL output pulse and a period of the control pulse signal, and supplies a timing control signal to the drive circuit to variably control OFF timing of the second transistor by the second control signal when a difference of not less than a predetermined reference value is generated between the period of the PLL output pulse and the period of the control pulse signal wherein, during a time in which the difference of not less than a predetermined reference value is not generated between the period of the PLL output pulse and the period of the control pulse signal, the drive circuit sets the second control signal to a conduction level when a difference in potential is zero between both ends of the second transistor, and sets the same to a non-conduction level after a predetermined time has elapsed.

4. A switching regulator that is connected to a power source, generates an output voltage adjusted to a target voltage, and supplies the adjusted output voltage to an external circuit, comprising:

a switching regulator circuit having a coil that receives current from the power source and accumulates energy, a first transistor that is connected to the coil and is turned ON when energy accumulates in the coil, and a second transistor that is connected to the coil and is turned ON when power is applied to or drawn from the external circuit;

a feedback circuit that monitors the output voltage of the switching regulator circuit, and outputs a control pulse signal at a frequency corresponding to the output voltage;

a PLL circuit unit having a PLL circuit that receives the control pulse signal and a first control signal for controlling a conduction of the first transistor, and generates a PLL output pulse of a frequency corresponding to a phase difference between the control pulse signal and the first control signal; and a first control signal generating circuit that sets the first control signal to a conduction level or non-conduction level according to the signal of one end of the coil and the PLL output pulse; and a second control signal generating circuit for generating a second control signal that controls a conduction of the second transistor;

wherein, during a time in which the PLL circuit is in a locked-on condition, the second control signal generating circuit sets the second control signal to a conduction level when a difference in potential is zero between both ends of the second transistor, and sets the same to the non-conduction level after a predetermined time has elapsed, and variably controls the conduction and non-conduction timing of the second transistor by the second control signal when the PLL circuit is in a locked-off condition.

* * * * *